(12) United States Patent
Savaria

(10) Patent No.: US 6,293,748 B1
(45) Date of Patent: Sep. 25, 2001

(54) STORABLE RAMP ASSEMBLY

(76) Inventor: Pierre Savaria, 50, Chené, Ste-Marthe-sur-le-Lac Québec JON 1PO (CA)

(*) Notice: Subject to any disclaimer, the term of this patent is extended or adjusted under 35 U.S.C. 154(b) by 0 days.

(21) Appl. No.: 09/592,889

(22) Filed: Jun. 13, 2000

(51) Int. Cl.[7] ....................................................... B60P 1/44
(52) U.S. Cl. ........................ 414/537; 414/921; 414/546; 14/69.5
(58) Field of Search ..................................... 414/537, 538, 414/539, 546, 921; 14/69.5, 71.1, 71.3, 71.5, 71.7

(56) References Cited

U.S. PATENT DOCUMENTS

| | | | |
|---|---|---|---|
| 3,818,528 | * 6/1974 | Petersen | 14/69.5 |
| 4,718,812 | * 1/1988 | Smalley et al. | 14/69.5 X |
| 5,062,174 | * 11/1991 | DaSalvo | 14/69.5 |
| 5,228,538 | 7/1993 | Tremblay . | |
| 5,308,215 | 5/1994 | Suacier | 414/546 |
| 5,636,399 | 6/1997 | Tremblay et al. | 14/71.1 |
| 5,671,496 | * 9/1997 | Smith | 14/69.5 |
| 5,697,754 | * 12/1997 | Raymer | 414/537 |
| 5,752,800 | * 5/1998 | Brincks et al. | 414/537 |

FOREIGN PATENT DOCUMENTS

| | | | |
|---|---|---|---|
| 3326027 | * 1/1985 | (DE) | 414/537 |
| 2215301 A | * 9/1989 | (GB) | 414/537 |

OTHER PUBLICATIONS

"Activan by Ricon", Copyright 1998, Ricon Corporation U. S. A., 6 pages, (1998).

"Activan Ford Windstar Ricon innovation in Mobility", Copyright 1996, Ricon Corporation U. S. A., 2 pages, 91996).

"FoldAway A6000", Copyright 1999, Ricon Corporation, U. S. A., 2 pages, (1999).

* cited by examiner

*Primary Examiner*—Frank E. Werner (57) ABSTRACT

A storable ramp assembly for use with carrier vehicles such as light van is described herein. The storable ramp comprises a panel assembly hingedly mounted between first and second generally parallel longitudinal end members. The panel assembly includes a plurality of longitudinal intermediate panels hingedly mounted side by side so as to render the panel assembly accordion foldable. The storable ramp assembly further include a deployment mechanism in the form of a pivoting bar pivotally mounted to the first end member and slidably mounted to the second end member. The pivoting bar is used to position the first and second end members between a close and a spaced relationship. When the end members are in a close relationship, the intermediate panels are layered and the ramp assembly is in a storing configuration. Concurrently, when the end members are in a spaced relationship, the intermediate panels are oriented so as to form a generally continuous plane and the ramp assembly is in an operating configuration.

15 Claims, 6 Drawing Sheets

STORABLE RAMP ASSEMBLY

FIELD OF THE INVENTION

The present invention relates to ramp assemblies. More specifically, the present invention is concerned with a ramp assembly that is storable, particularly in a vehicle.

BACKGROUND OF THE INVENTION

The increasing use of light vans and other such carrier vehicles to carry people increases the need of means to facilitate the boarding of those relatively high vehicles, especially when such vehicles are used for transporting people having mobility problems. Such means are also more than useful when the vehicle is used to transport goods that may require a parcel truck or a hand truck to carry them in and out of the vehicle.

Boarding means for light carrier vehicles can generally be discriminated in two categories: lifts and ramps.

In U.S. Pat. No. 5,228,538, issued on Jul. 20, 1993 and entitled "Passenger Lift with an Electric Safety Interlock", Jules M. Tremblay describes a passenger lift to help people into and out of vans and buses. Tremblay's lift comprises a platform pivotally connected to the vehicle by a pair of spaced armatures. The lift also includes mechanisms to move the platform from a storage position to a horizontal position as well as to operate the platform.

Tremblay's lift possesses drawbacks common to most lifts. First, the lifting and storing mechanisms are bulky and require passenger and/or storage room. Secondly, since the lift is attached to the floor of the vehicle near one of the doors thereof, it obstructs the passageway to the passengers who want to board the vehicle without using the lift. Moreover, the lift cannot be easily moved to facilitate boarding the vehicle through another entrance.

Ramps are usually less obstrusive since they usually do not include a lifting mechanism. An example of such a ramp is described in U.S. Pat. No. 5,636,399, which was issued to Tremblay et al. on Jun. 10, 1997, and entitled "Movable Ramp Assembly". The proposed ramp assembly includes mounting structures, guides and a deployment mechanism to store and deploy the ramp.

A first drawback of this ramp assembly is that the deployment mechanism is relatively complex and therefore prone top break.

Another drawback of Tremblay's ramp assembly is that it requires mounting structures to be fixedly mounted to the vehicle and thus cannot be moved from between different entrances of the vehicle according to boarding requirements.

OBJECTS OF THE INVENTION

An object of the present invention is therefore to provide an improved ramp assembly.

Another object of the invention is to provide a ramp assembly that is both storable and configured for mobility.

SUMMARY OF THE INVENTION

More specifically, in accordance with the present invention, there is provided a storable ramp assembly comprising:

first and second generally parallel longitudinal end members;

a panel assembly hingedly mounted to the first and second end members and including at least two longitudinal intermediate panels hingedly interconnected side by side; and a ramp deployment mechanism mounted between the first and second end members to move the first and second end members between a close and a spaced relationship;

wherein, a) when the first and second end members are in a close relationship, at least two intermediate panels are layered and the ramp assembly is in a storing configuration and b) when the first and second end members are in a spaced relationship, the at least two intermediate panels are oriented so as to form a generally continuous plane and the ramp assembly is in an operating configuration.

Other objects, advantages and features of the present invention will become more apparent upon reading of the following non-restrictive description of preferred embodiments thereof, given by way of example only with reference to the accompanying drawings.

DESCRIPTION OF THE PREFERRED EMBODIMENT

Figure 1:
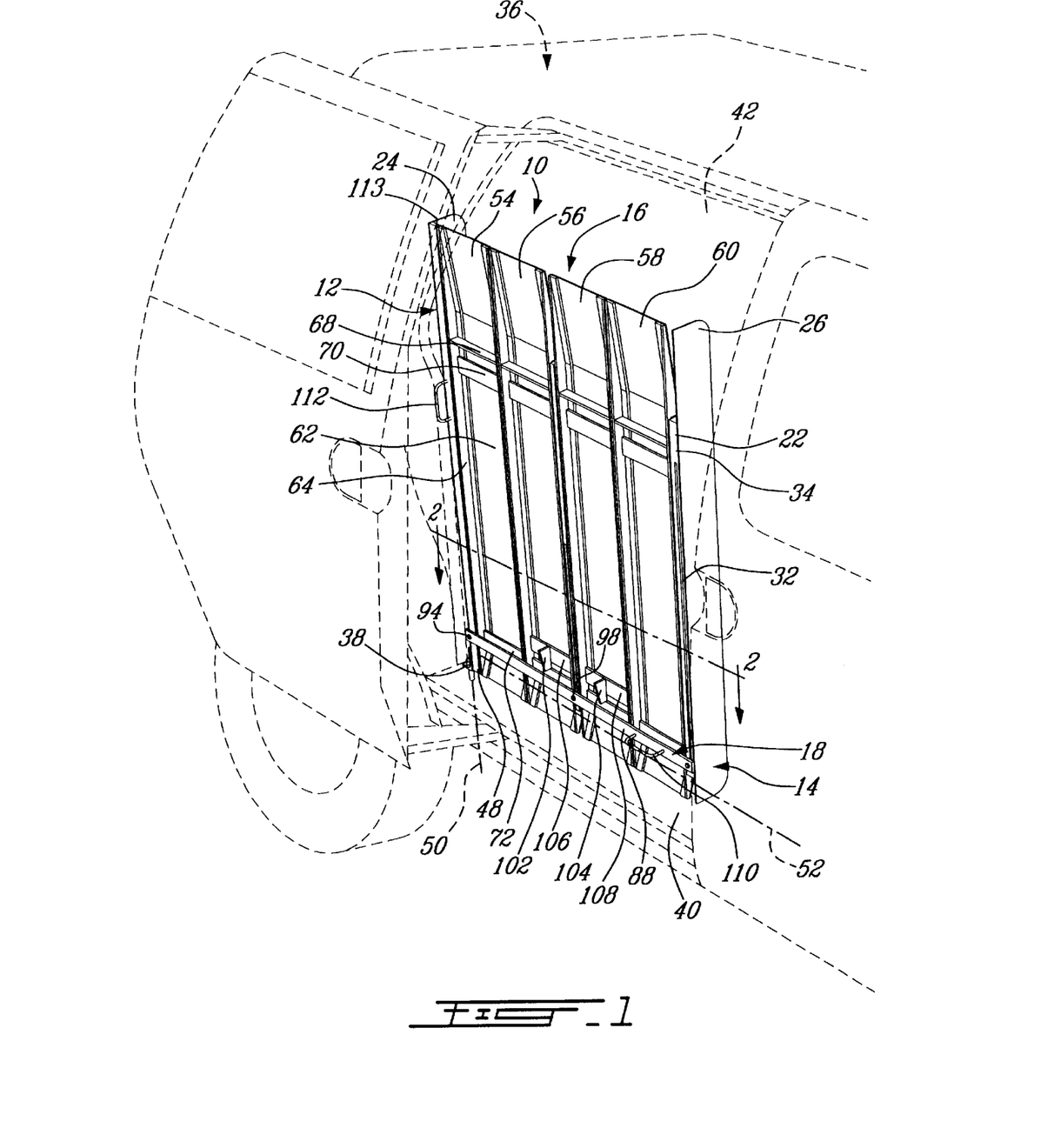
FIG. 1 is a perspective view of a storable ramp assembly according to an embodiment of the present invention, illustrated mounted near the side door of a van and in an extended position.
Figure 2:
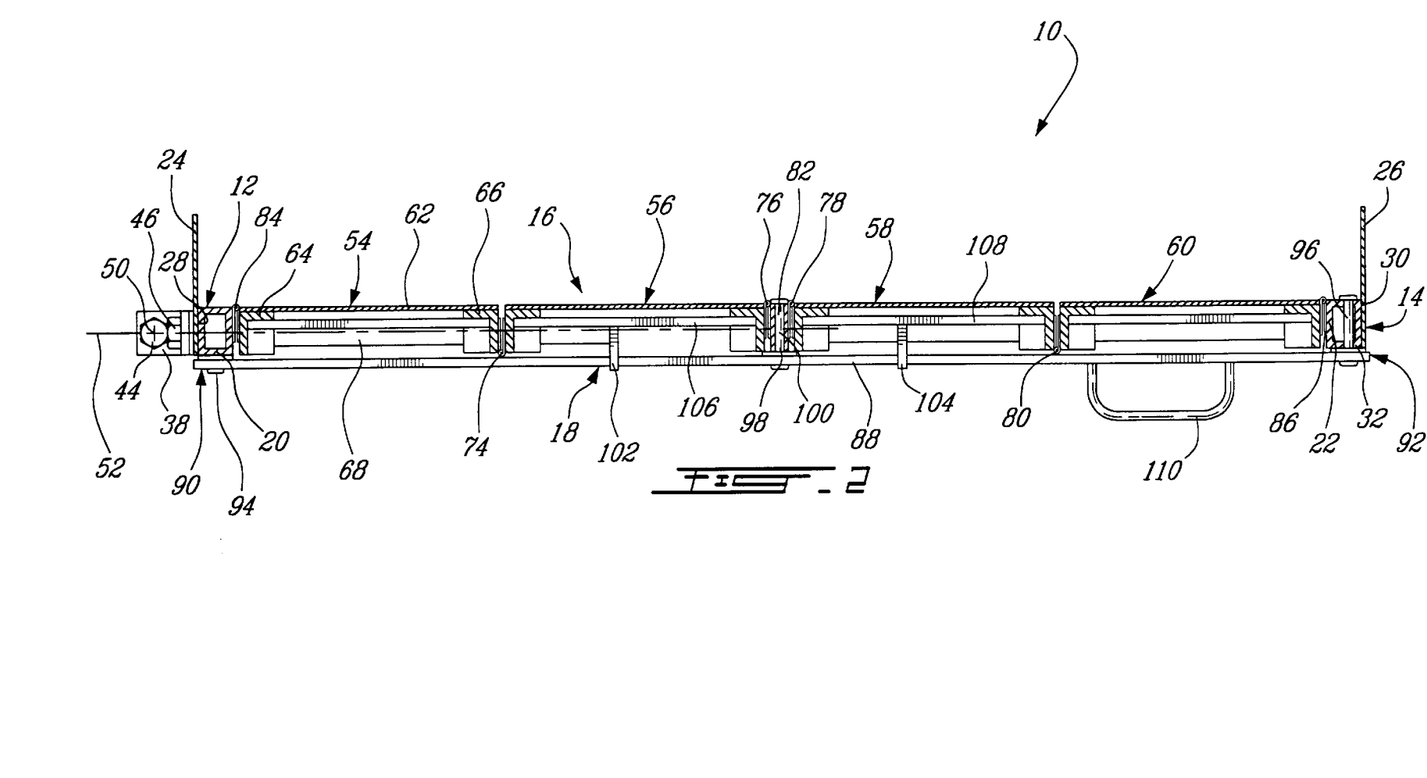
FIG. 2 is a sectional view taken along line 2—2 of FIG. 1.

Turning now to FIGS. 1 and 2 of the appended drawings, a storable ramp assembly 10 according to a preferred embodiment of the present invention will be described.

The storable ramp assembly 10 comprises first and second generally parallel longitudinal end members 12 and 14, a panel assembly 16 hingedly mounted to the first and second end members 12 and 14 and a ramp deployment mechanism 18 mounted to and between the first and second end members 12 and 14.

It is to be noted that all the components of the storable ramp assembly 10 are advantageously made of aluminum or other light and heavy-duty material. Alternatively, other material suitable for withstanding the maximum foreseen weight of the charges that will be put on the storable ramp assembly 10 could also be used.

The first and second longitudinal end members 12 and 14 comprise rectangular hollow members 20 and 22 provided with guide rails 24 and 26 mounted on their respective outer lateral sides 28 and 30.

The guide rails 24 and 26 advantageously help prevent a hand truck (not shown) or other carrying means from falling from the sides of the storable ramp assembly 10.

The second longitudinal end member 14 is provided with a longitudinal channel 32 in the side 34, adjacent side 30, and opposite the inside of the van 36 into which the ramp assembly 10 is mounted. The channel 32 can be viewed as part of the deployment mechanism 18, as will be explained hereinbelow.

The first longitudinal end member 12 includes an L-shaped mounting bracket 38 provided to pivotally mount the first end member 12, and therefore the storable ramp assembly 10, to the inside floor 40 of the van 36. For reasons that will become obvious upon reading the ongoing description, the first longitudinal end member 12 is advantageously mounted near the opening 42.

The mounting bracket 38 includes vertical and horizontal pivot pins in the form of bolts 44 and 46 fixedly mounted respectively to the floor 40 of the van and to the lateral end 48 of the first longitudinal section 12. As will now appear obvious to someone skilled in the art, the mounting bracket allows the first longitudinal end member 12, and the ramp assembly 10, since it is fixedly mounting thereto, to pivot about the axes 50 and 52.

It can be appreciated that the mounting bracket 38 allows the storable ramp assembly 10 to be easily mounted to a vehicle, without modification to the vehicle's configuration or the need for a complex mounting structure.

The panel assembly 16 comprises four longitudinal intermediate panels 54, 56, 58 and 60. For concision purposes and since all four longitudinal intermediate panels 54–60 are very similar, only the longitudinal intermediate panel 54 will be described herein.

The intermediate panel 54 includes a central portion 62 secured between two L-shaped side portions 64–66 using welding or other equivalent securing means.

Figure 5:
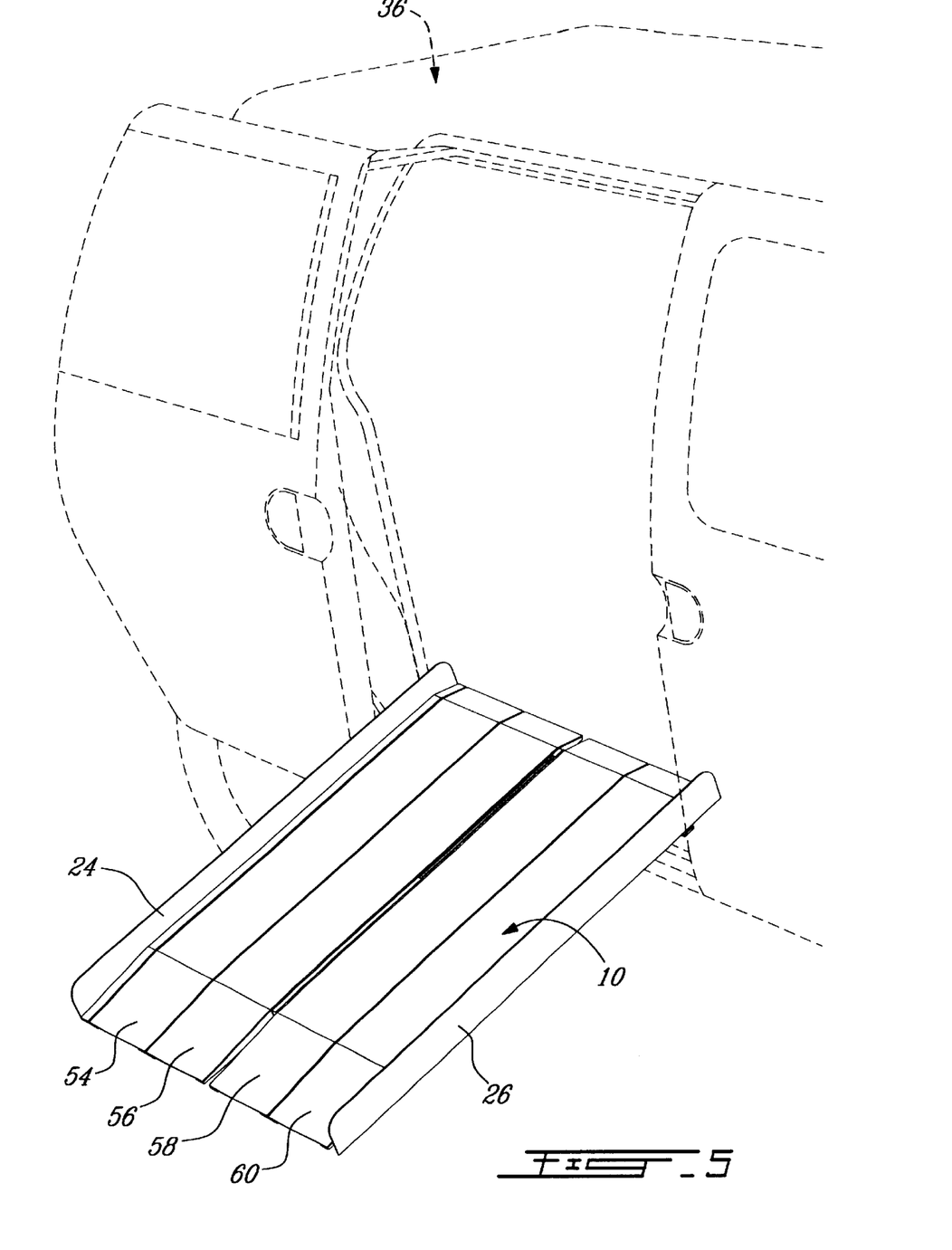
FIG. 5 is a perspective view of the storable ramp of FIG. 1, illustrated in an operating position.

The central portion 62 is advantageously bent near its proximate and distal ends to provide a smooth transition with the ground and the floor 40 of the vehicle 36 when the storable ramp 10 is in an operating configuration, as is clearly seen in FIG. 5.

It can be appreciated in FIG. 5 how the bent portions near the proximate and distal ends of the intermediate panels 54–60 advantageously provide a smooth transition with the ground and with the floor 40 of the vehicle 36.

The intermediate panel 54 also advantageously includes optional transversal reinforcement plates 68, 70 and 72.

The intermediate panels may have other configurations and/or sizes without departing from the spirit of the present invention.

The intermediate panels 54–60 are pivotally interconnected side by side via conventional hinges 74, 76, 78 and 80. Hinges 74 and 80 are advantageously positioned with their openings opposite the openings of hinges 76 and 78 to allow the panel assembly 16 to be accordion-foldable. For that purpose, the intermediate panels 56 and 58 are advantageously interconnected via a longitudinal spacing member 82 to which the hinges 76 and 78 are secured.

The panel assembly 16 is also hingedly mounted between the two longitudinal end members 12 and 14 via hinges 84 and 86, the pivot pin of which are also configured to allow the aforementioned accordion-foldable feature of the ramp 10.

Hinges 74–80 and 84–86 are secured by any conventional securing means such as welding or screws.

The deployment mechanism 18 includes a pivoting bar 88 having a first end 90 and a second end 92 respectively mounted to the first and second end members 12 and 14.

The first end 90 of the pivoting bar 88 is pivotally mounted near the lower end 48 of the first longitudinal end member 12 via a pivot pin 94. The second end 92 is slidably mounted in the longitudinal channel 32 of the second longitudinal end section 14 via a second pin 96. The center of the pivoting bar 88 is also slidably mounted in a longitudinal channel 98 of the longitudinal spacing member 82 via a third pin 100.

It is to be noted that the second end 92 of the pivoting bar 88 may alternatively include a mounting bracket to replace the second pin 96 for slidably mounting the second end 92 of the pivoting bar 88 to the second longitudinal end member 14. When such a bracket is used, the longitudinal channel 32 is obviously not required.

Similarly, the center of the pivoting bar 88 may alternatively include a mounting bracket to replace the third pin 100 for slidably mounting the center of the pivoting bar 88 to the spacing member 82. When such a bracket is used, the longitudinal channel 98 is obviously not required.

While the third pin 100 is described herein as being mounted to the center of the pivoting bar 88, the third pin 100 may also be mounted at another location on the pivoting bar 88 between the first and second end 90–92 without departing from the spirit of the present invention.

The deployment mechanism 18 also advantageously includes starting members 102 and 104 respectively secured to the two central intermediate panels 56 and 58 via respective mounting plates 106 and 108, using welding or other securing means. The starting members 102 and 104 are secured to the mounting plates 106 and 108 using welding or other securing means.

The starting members 102 and 104 are so configured as to gradually extend away from the mounting plates 106 and 108 as they extend from the proximate end of the central intermediate panels 56 and 58. The purpose of the starting members 102 and 104 will be described hereinbelow.

The pivoting bar 88 is advantageously provided with a handle 110, advantageously secured between the second pin 96 and the third pin 100, and advantageously oriented along the longitudinal direction of the pivoting bar 88.

The first longitudinal end member 12 is also provided with a handle 112 located somewhere between its center and its distal end 113 and advantageously oriented along the longitudinal direction of the member 12. The two handles 110–112 are secured by welding or other securing means.

It is to be noted that the guide rails 24 and 26 and the bent portions are optional and one can conceive a ramp assembly without such characteristics without departing from the spirit of the present invention.

Turning now to FIGS. 1 to 5, the operation of the storable ramp assembly 10 will now be described.

FIG. 1 illustrates the ramp assembly 10 in an operating configuration, i.e. extended. In this operating configuration, the first and second members 12 and 14 are in a spaced relationship and the intermediate panels 54–60 are oriented and positioned so as to form a generally continuous plane. When in this configuration, the ramp assembly 10 can then be used for boarding after being pivoted about axis 52 as can be better seen in FIG. 5.

To store the ramp assembly 10 when the ramp is in the boarding position of FIG. 5, the ramp is first raised by pivoting it about the axis 52 to place it in the position illustrated in FIG. 1.

Figure 3:
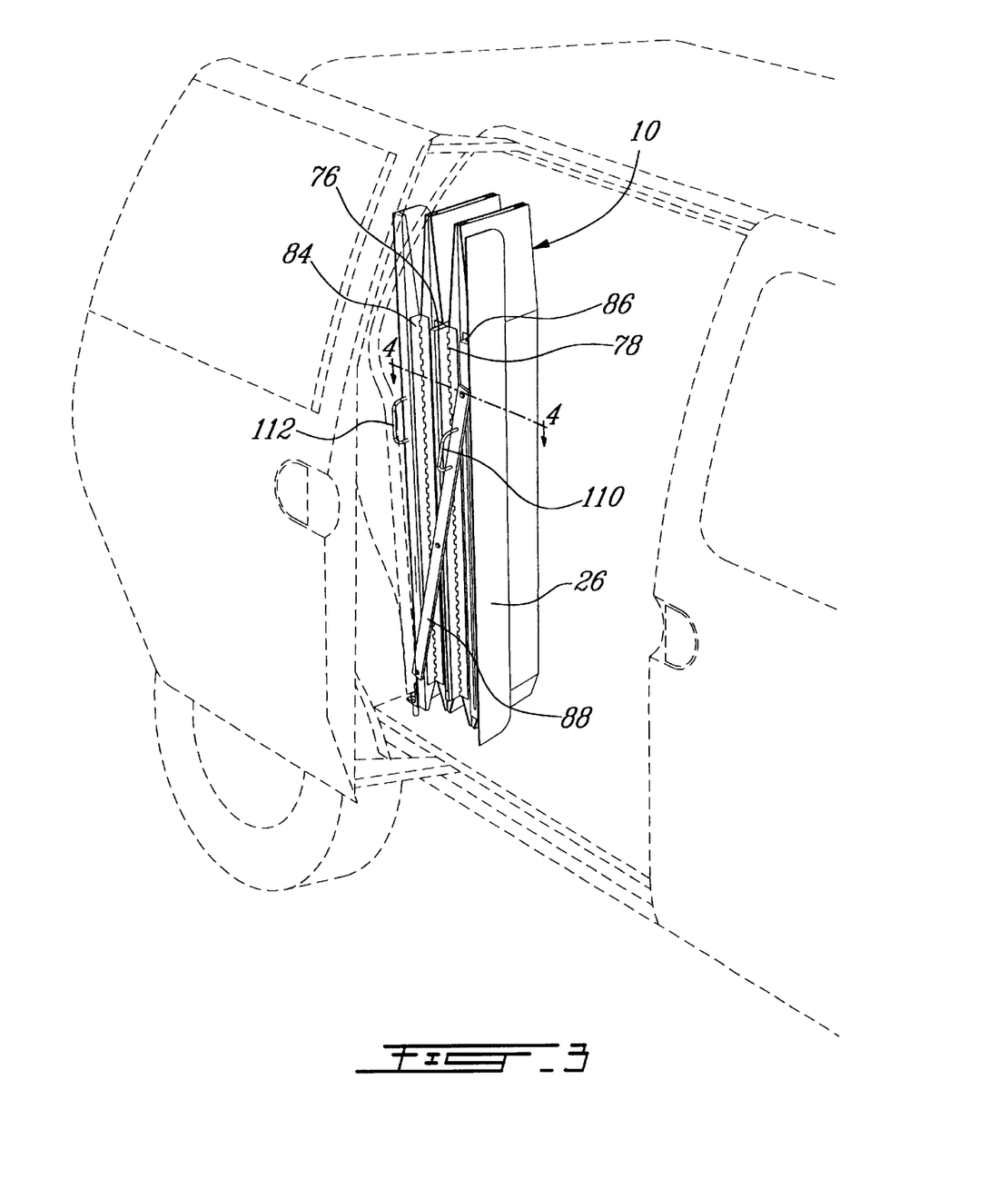
FIG. 3 is a perspective view of the storable ramp of FIG. 1, illustrated in a storing position.
Figure 4:
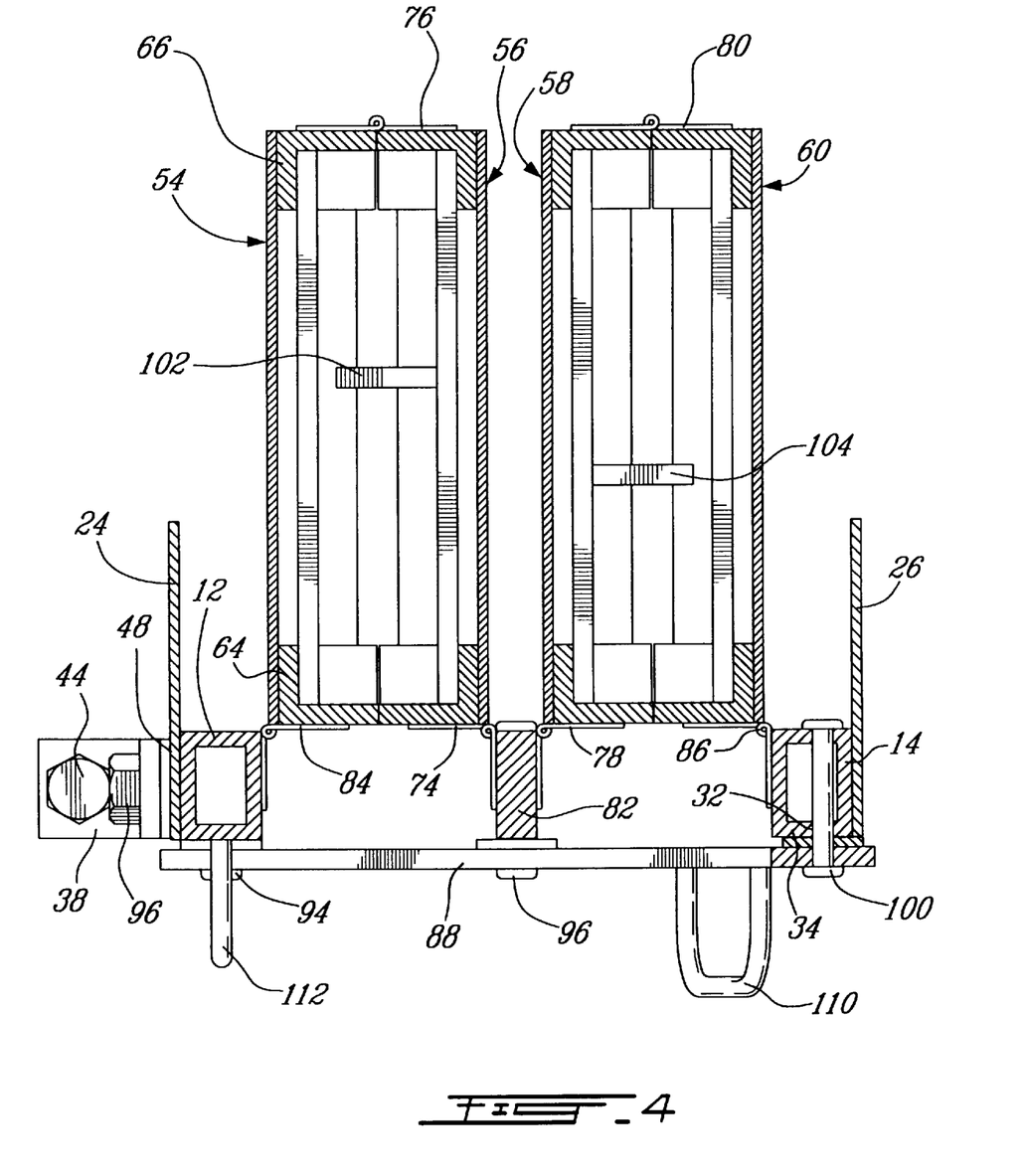
FIG. 4 is a sectional view taken along line 4—4 of FIG. 3

The deployment mechanism 18 may be used to bring the first and second longitudinal members 12 and 14 in a close relationship, resulting in the storable ramp assembly 10 being then in a storing configuration, as illustrated in FIG. 3. The operation of the deployment mechanism 18 will now be described in more detail.

It is generally advantageous to use the deployment mechanism 18 while the ramp assembly is in a generally upright position, as illustrated in FIG. 1.

An operator advantageously holds the handle 112 with one hand to ensure that the ramp assembly 10 does not pivot about the axis 52 while the deployment mechanism 18 is operated. The ramp assembly 10 can optionally be provided with mechanical stops (not shown) or other holding means to prevent the ramp assembly 10 from pivoting about axis 50 and/or 52 during deployment.

The operator uses the other hand to lift the handle 110, causing the bar 88 to pivot about the first pin 94 while the second and third pins 96 and 100 respectively slide in the longitudinal channel 98 of the spacing member 82 and in the channel 32 of the second end member 14. Since the first, second and third pins 94, 96 and 100 keep the first, second and spacing members 12, 14 and 82 in the same plane, and since the intermediate panels 54–40 are pivotally mounted side by side, lifting of the pivoting bar 88 brings the first, second and space members 12, 14 and 82 in a close relationship and allows the intermediate panels 54–60 to accordion-fold.

It can now be appreciated how the starting members 102–104 advantageously help the folding of the intermediate panels 54–60. Indeed, when the sliding bar 88 contacts the starting members 102–104, the edge of the intermediate panels 56–58 that are adjacent respectively to the intermediate panels 54 and 60 are pushed away from the pivoting bar 88, hence starting the accordion-like folding process.

As will now be understood by a person of ordinary skills in the art, to unfold the storable ramp assembly 10, the operator simply has to lower the handle 110.

FIG. 5 illustrates the ramp assembly 10 in its storing configuration with the intermediate panels 54–60 layered.

The mounting of the ramp assembly 10 to the floor of a vehicle is optional. Indeed, the storable ramp assembly 10 is advantageously designed to be operated without a mounting mechanism, since the ramp assembly is configured to be held by an operator and since the deployment mechanism can be operated manually, without the requirement that the ramp assembly be attached to any structure.

Of course, if the storable ramp assembly 10 is used without the mounting bracket 38 or other mounting means, great care must be sought to ensure that the ramp assembly 10 is stable when positioned for boarding.

Figure 6:
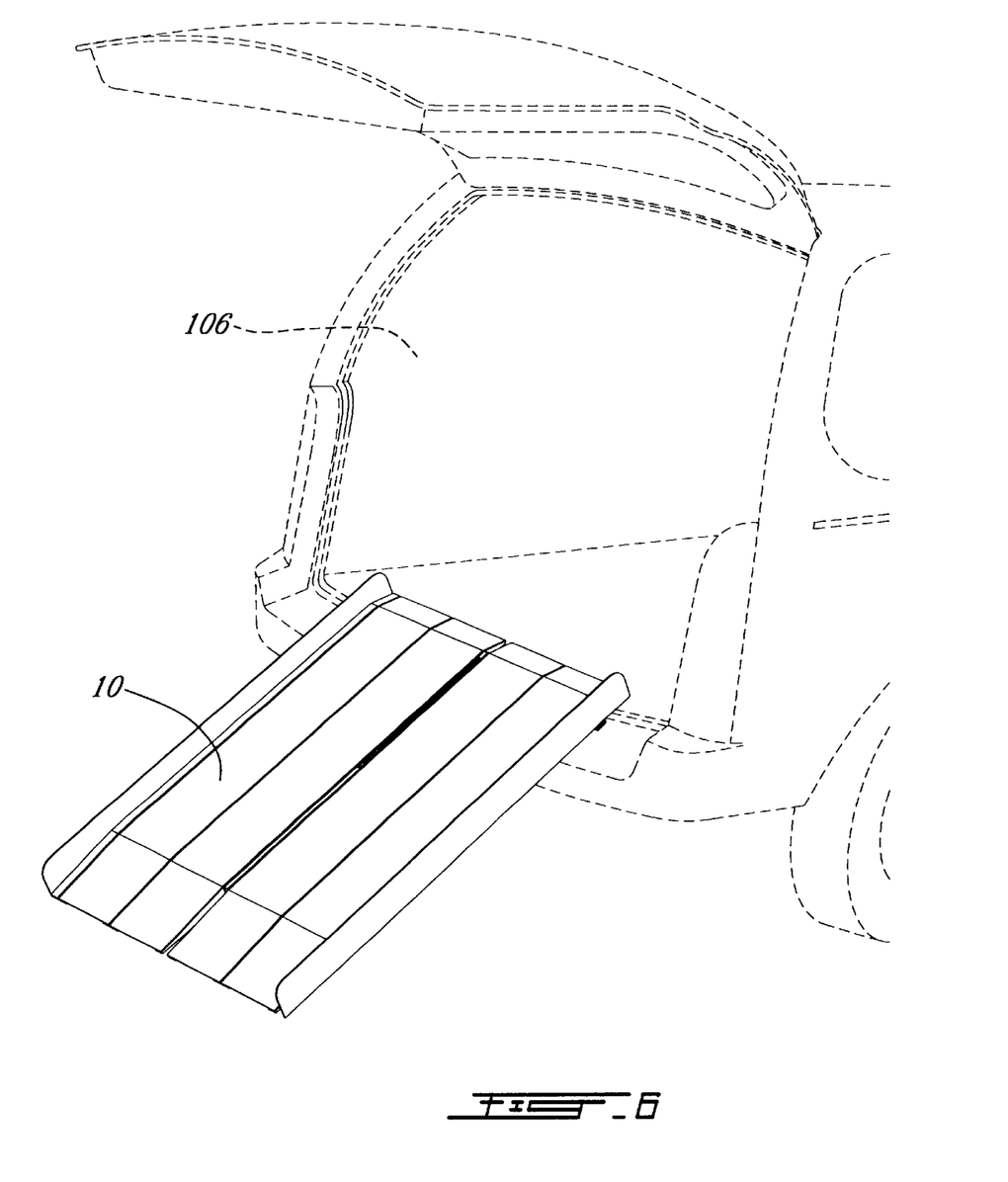
FIG. 6 is a perspective view of the storable ramp of FIG. 1, illustrated mounted near the back door of a van and in its operating position.

It may be advantageous to be able to move the ramp assembly to use it for boarding more than one entrance of a vehicle, including, the back door 106 of the van 36 as illustrated in FIG. 6. Such a movable storable ramp can also be used for boarding other entrance remote from the vehicle in which it is transported.

Storable ramp assemblies 10, according to embodiments of the present invention, can have different configurations and dimensions without departing from the spirit of the present invention.

Furthermore, a storable ramp assembly 10, according to an embodiment of the present invention, may be configured and sized to allow boarding of many types of leveled entrances without departing from the spirit of the present invention.

Although the present invention has been described hereinabove by way of preferred embodiments thereof, it can be modified without departing from the spirit and nature of the subject invention, as defined in the appended claims.

What is claimed is:

1. A storable ramp assembly, comprising:
    a panel assembly including a series of adjacent panels, each panel extending in a first direction; said series of adjacent panels being hingedly interconnected via hinges so as to be accordion-foldable;
    first and second longitudinal end members extending in said first direction and being respectively mounted via a hinge to first and last panels of said series of adjacent panels; and
    a ramp deployment mechanism mounted to said first and second end members to move said first and second end members between a close and a spaced relationship, said spaced relationship corresponding to an operating configuration of said ramp assembly;
    wherein the hinged interconnectivity of said panels between said first and second end members forces said panel assembly
       a) to accordion-fold when said first and second end members are moved in a close relationship by said ramp deployment mechanism, and
       b) to extend in a direction transversal to said first direction when said first and second end members are moved in a spaced relationship by said ramp deployment mechanism.

2. A storable ramp assembly as recited in claim 1, wherein said deployment mechanism includes a pivoting bar mounted to said first and second end members.

3. A storable ramp assembly as recited in claim 2,
    wherein said pivoting bar is pivotally mounted to said first longitudinal end member near an end therefrom and slidably mounted to said second longitudinal end member; and
    wherein pivoting said bar allows to laterally move said second longitudinal end member with respect to said first longitudinal end member between said spaced and close relationship.

4. A storable ramp assembly as recited in claim 3, wherein said second longitudinal end member includes a longitudinal channel and said pivoting bar includes a first pin for slidably mounting said pivoting bar to said second end member.

5. A storable ramp assembly as recited in claim 4, wherein said panel assembly further comprising a spacing member between two of said at least two longitudinal panels; said spacing member including a longitudinal channel and said bar includes a second pin for slidably mounting said pivoting bar to said spacing member.

6. A storable ramp assembly as recited in claim 3,
    wherein said at least one of said panels includes a starting member positioned to be on the path of said bar when said bar is pivoted; and
    wherein, said starting member pushes said at least one panel away from said bar when said bar contacts said starting member and said second end member moves towards said first end member, thus initiating the accordion-folding of said panel assembly.

7. A storable ramp assembly as recited in claim 6, wherein said starting member is so configured to gradually extend away from said at least one of said panels as said starting member extends from said bar when the ramp assembly is in said operating configuration.

8. A storable ramp assembly as recited in claim 2, wherein at least one of said first longitudinal end member and said pivoting bar includes a handle.

9. A storable ramp assembly as recited in claim 1, wherein at least one of said first and second end members includes a guide rail.

10. A storable ramp assembly as recited in claim 1, wherein one of said first and second end members includes a mounting bracket.

11. A storable ramp assembly as recited in claim 10, wherein said mounting bracket including at least one pivot pin for pivotally mounting the storable ramp assembly to a structure.

12. A storable ramp assembly as recited in claim 1, wherein at least one of said adjacent panels includes two side portions and a central portion having proximate and distal ends.

13. A storable ramp assembly as recited in claim 1, wherein said at least on said adjacent panels includes at least one reinforcement plate.

14. A storable ramp assembly as recited in claim 1, wherein at least two intermediate panels are interconnected via a spacing member.

15. A storable ramp assembly, comprising:

a panel assembly including a series of adjacent panels, each panel extending in a first direction; said series of adjacent panels being hingedly interconnected via hinge means so as to be accordion-foldable;

first and second longitudinal end members extending in said first direction and being respectively mounted via hinge means to first and last panels of said series of adjacent panels; and ramp deployment means mounted to said first and second end members to move said first and second end members between a close and a spaced relationship; said spaced relationship corresponding to an operating configuration of said ramp assembly;

wherein the hinged interconnectivity of said panels between said first and second end members forces said panel assembly
 a) to accordion-fold when said first and second end members are moved in a close relationship by said ramp deployment means; and
 b) to extend in a direction transversal to said first direction when said first and second end members are moved in a spaced relationship by said ramp deployment means.

* * * * *